No. 638,157. Patented Nov. 28, 1899.
E. WILSON & J. McI. CATER.
SYSTEM OF ELECTRICAL DISTRIBUTION.
(Application filed June 16, 1899.)
(No Model.)
*Fig: 1.*
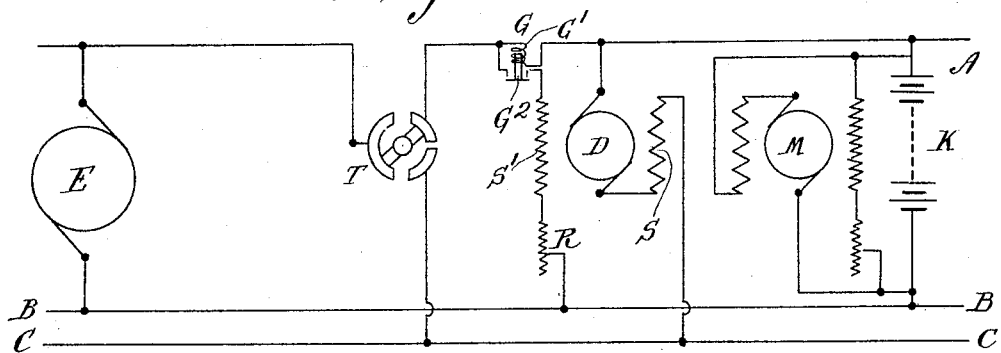
*Fig: 2.*
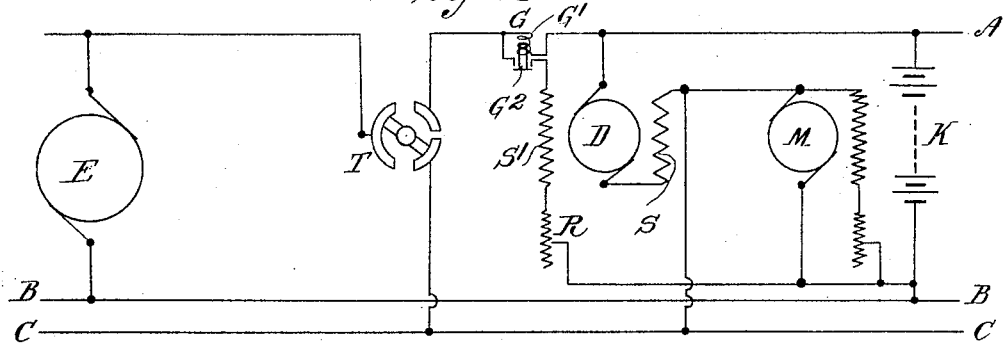
*Fig: 3.*
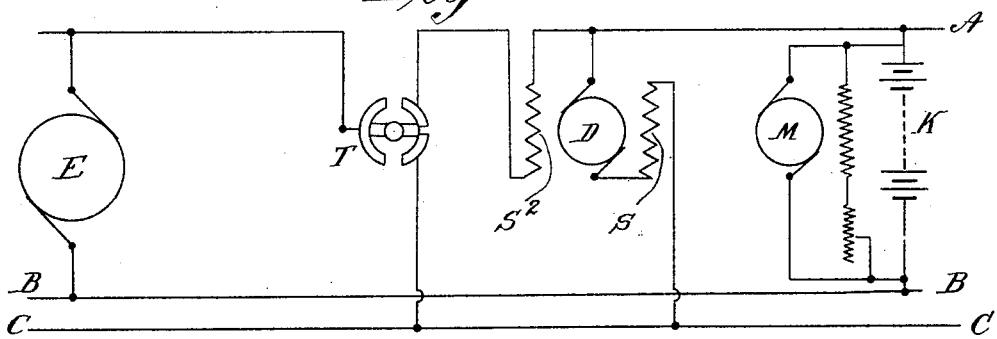
Witnesses
Inventors

UNITED STATES PATENT OFFICE.

ERNEST WILSON AND JOHN McILVAINE CATER, OF LONDON, ENGLAND.

SYSTEM OF ELECTRICAL DISTRIBUTION.

SPECIFICATION forming part of Letters Patent No. 638,157, dated November 28, 1899.

Application filed June 16, 1899. Serial No. 720,876. (No model.)

*To all whom it may concern:*

Be it known that we, ERNEST WILSON, professor of electrical engineering, of 64 St. John's Park, Blackheath, London, in the county of Kent, and JOHN McILVAINE CATER, engineer, of Southdown, The Downs, Wimbledon, London, in the county of Surrey, England, subjects of the Queen of Great Britain, have invented a new and useful Improvement in Systems of Electrical Distribution, (for which we have made application for Letters Patent in Great Britain, No. 24,104, filed November 15, 1898,) of which the following is a specification.

Our invention relates to systems of electrical distribution, and in particular to those systems wherein storage-cells are used in conjunction with a main generator to supply current to a work-circuit containing translating devices.

The object of our invention is to provide for maintaining the potential difference between the two points in a discharge-circuit constant or nearly constant during charge or discharge of the storage-cells.

The accompanying drawings are diagrams illustrating systems of electrical distribution in accordance with our invention.

Figure 1 is a diagram illustrating a system of electrical distribution in accordance with our invention. Figs. 2 and 3 are diagrams illustrating modifications of the system.

A and B are conductors connected to the main generator E and to the storage battery K.

B and C are the line conductors supplying current to translating devices and between which it is desired to maintain the potential difference constant.

M is a motor which drives an auxiliary generator D, the field-magnet of said generator being provided with two coils, one of which, S, is in series with the armature and with the work-circuit, being connected between the conductors A and C.

T is a switch by means of which the main generator E can be connected to the conductor A, as shown in Fig. 1, or to the conductor C, as shown in Fig. 2, or to both of said conductors, as shown in Fig. 3.

The generator D is provided with a second magnetizing-coil which is so arranged as to magnetize the field-magnet in the opposite direction to that in which the coil S magnetizes said field-magnet, so that the electromotive force supplied by said generator depends on the difference between the magnetism due to the coil S and that due to the second coil. In Figs. 1 and 2 the second coil is marked S' and is joined as a shunt to the generator D, being provided with the usual adjustable resistance R; but in Fig. 3 the second coil (marked S²) is joined in series between the main generator E and the generator D.

The operation of the system is as follows: The generator D rotates in such a direction and when the battery K is supplying current to the work-circuit is magnetized by the discharge-current passing through the coil S in such a direction that its electromotive force aids that of the battery—that is to say, the potential difference between B and C is greater than that between B and A. The extent to which the potential difference of the battery K has to be increased in this way in order to maintain the potential difference between B and C constant, or nearly so, depends upon the ohmic resistances of the battery, the generator D, the coil S, and the necessary connecting-lead, and upon the discharge-current and armature reaction in said generator. When, however, the battery K is being charged by a current conveyed to it from the main generator E through the conductors A and B, the second magnetizing-coil on the field-magnet of the generator D is energized, and the electromotive force supplied by the generator D is reduced according to the strength of the charging-current supplied by the main generator E. By this means the potential difference between the conductors B and C is maintained approximately constant, whereas if the generator D be omitted the potential difference supplied to the work-circuit will be greater when the battery K is being charged than when it is being discharged.

In Figs. 1 and 2 the second magnetizing-coil S' of the generator D is arranged as a shunt, being provided with a switch G, by means of which its circuit is opened and closed. Said switch may be operated by hand; but in some cases it is desirable to arrange that it shall be automatically operated to close the circuit as soon as a charging-current is supplied to the battery K. For this purpose an electromagnetic device may be provided, as illustrated diagrammatically in Figs. 1 and 2, by a solenoid G', arranged with a cooperating magnet-core G², which when the coil is energized is attracted and completes the connection between the shunt-circuit S' and the conductor A. This switch may be arranged in any well-known manner, so that it does not make the circuit until the current rises to a predetermined value. If desirable, said switch may be operated at a distance by the aid of separate conductors instead of by the charging-current in the conductor A.

It is clear from what has already been stated that if the current through the coil S', Figs. 1 and 2, or through the coil S², Fig. 3, is so large as to reverse the polarity of the generator D the electromotive force of said generator will oppose that of the battery K— that is to say, the potential difference between the conductors A and B is greater than that between B and C. The effect of the discharge-current in the coil S is, however, still felt, as it reduces the electromotive force of the generator D in approximate proportion to the increase of the discharge-current instead of increasing it, as is the case when the charging-current is zero or small.

The motor M may be of any suitable type. In Fig. 1 a compound wound motor and in Figs. 2 and 3 a shunt-motor are illustrated. In the diagram Fig. 2 the current for operating the motor passes through the generator D and must be allowed for in adjusting the magnetizing-coils of said generator.

It is obvious that in lieu of maintaining the potential between the conductors B and C constant we may arrange that the same shall be increased or decreased by suitably arranging the speed or magnetizing forces, or both, of the generator D.

What we claim is—

1. In a system of electrical distribution, the combination of a main generator, a storage battery in parallel therewith, a work-circuit supplied with current from said generator and battery, and an additional generator provided with differential magnetizing-coils, the armature and one of said coils being joined in series with the work-circuit being connected between a common terminal of the battery and main generator and a terminal of the work-circuit.

2. In a system of electrical distribution, the combination of a main generator, a storage battery in parallel therewith, a work-circuit supplied with current from said generator and battery, and an additional generator provided with differential magnetizing-coils, the armature and one of said coils being joined in series with the work-circuit being connected between a common terminal of the battery and main generator and a terminal of the work-circuit and the other of said coils being included in a shunt to the battery.

3. In a system of electrical distribution, the combination of a main generator, a storage battery in parallel therewith, a work-circuit supplied with current from said generator and battery, an additional generator provided with two magnetizing-coils, the armature and one of said coils being joined in series with the work-circuit the other of said coils being included in a circuit shunting the main generator, and an electromagnetic switch adapted to make the circuit through the last-mentioned coil when the current supplied to the battery from the main generator exceeds a predetermined amount.

4. In a system of electrical distribution, the combination of a main generator, a storage battery in parallel therewith, a work-circuit supplied with current from said generator and battery, an additional generator provided with differential magnetizing-coils the armature and one of said coils being joined in series with the work-circuit, and a switch in the main generator-circuit by means of which said generator may be connected to the battery or to the line or to both as desired.

5. In a system of electrical distribution, the combination of a main generator, a storage battery in parallel therewith, a work-circuit supplied with current from said generator and battery, an additional generator provided with two magnetizing-coils the armature and one of said coils being joined in series with the work-circuit, and an electric motor connected in the work-circuit for driving the additional generator.

In witness whereof we have hereunto set our hands in presence of two witnesses.

ERNEST WILSON.
JOHN McILVAINE CATER.

Witnesses:
FREDERICK WILLIAM LE TALL,
GEORGE WILLIAM ROSE.